Patented Apr. 25, 1950

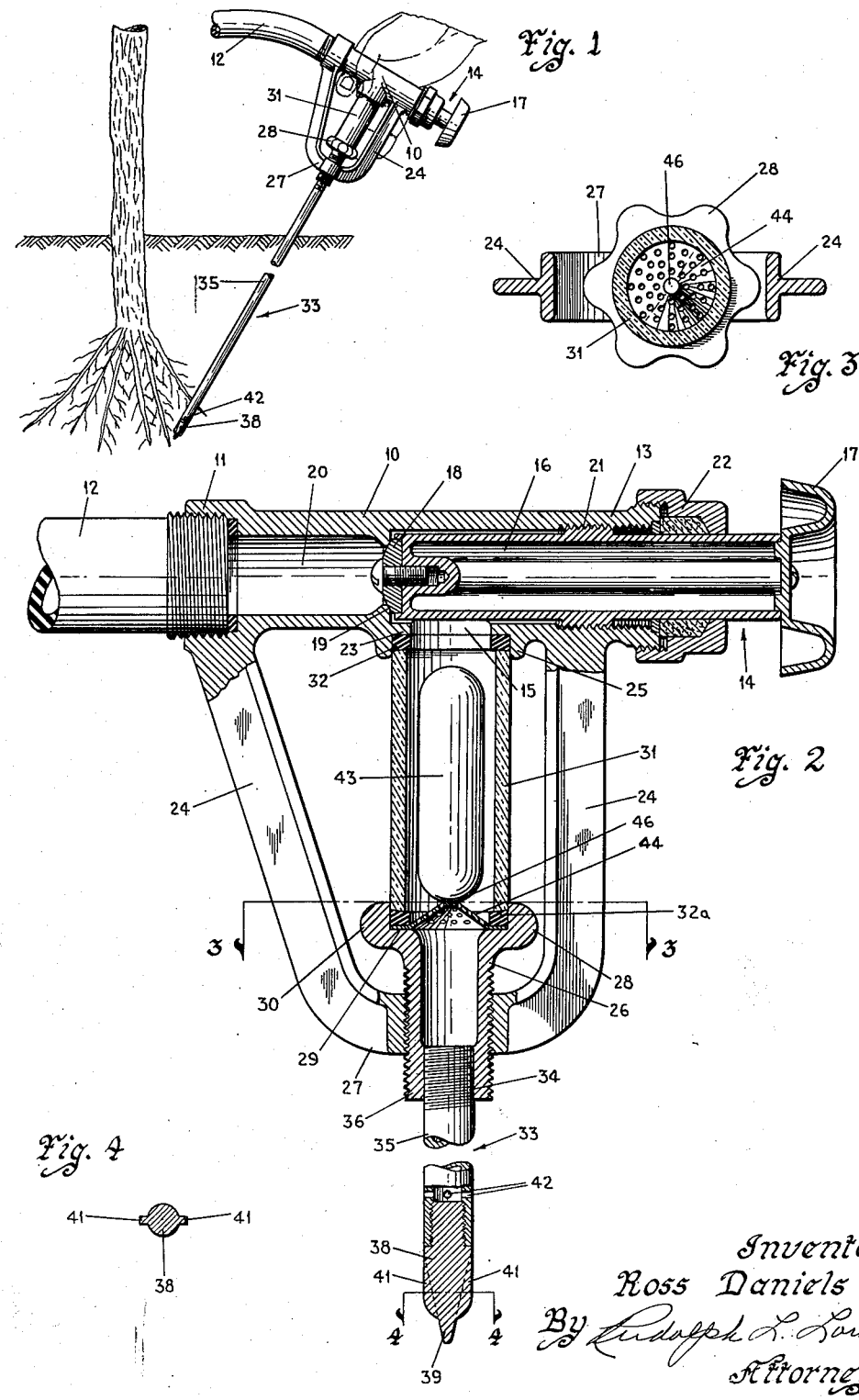

2,505,174

UNITED STATES PATENT OFFICE 2,505,174

ROOT FEEDING DEVICE

Ross Daniels, Des Moines, Iowa

Application September 18, 1946, Serial No. 697,754

2 Claims. (Cl. 111—7.1)

This invention relates generally to nozzle devices and in particular to a nozzle device for supplying a plant food to the roots of plants.

In the care of plants, and particularly in the care of plants grown in a yard or around a house such as trees, bushes, shrubs and the like, fertilizers and plant foods are required to supplement the plant food in the soil, or to supply food to "worn out" soil. Plant foods now in common use are generally spread or buried near the plant and depend upon rain or soil moisture for disintegration and penetration into the feeding zone for the plant roots. This procedure is generally unsatisfactory due to the fact that in many cases the plant food is washed away from the plants or works upwardly through the soil so as to be out of the feeding zone for the plants.

It is an object of this invention, therefore, to provide an improved nozzle device for supplying plant food to the roots of a plant.

A further object of this device is to provide a nozzle device which is insertable into the ground and adapted to supply a plant food directly into the plant feeding system or below such system for travel upwardly through the plant feeding system.

Yet another object of this invention is to provide a ground inserting nozzle device which is attachable to the end of a usual garden hose and constructed with a plant food container formed as part of the nozzle water passage system, so that the plant food from the container is carried in the water for distribution to the root system of the plant.

A particular feature of this invention is found in the provision of a ground inserting nozzle device for supplying food to the roots of a plant in which a removable transparent plant food container forms part of the nozzle water passage system. The disintegrating action of the water on the plant food is thus always visible to assure the container always being filled with a plant food during a root feeding operation.

Further objects, features and advantages of this invention will become apparent from the following description when taken in connection with the accompanying drawings, in which:

Fig. 1 is a reduced side elevational view of the nozzle device of this invention illustrating the manner of its use;

Fig. 2 is a longitudinal sectional view of the nozzle device; and

Figs. 3 and 4 are transverse sectional views as seen along the lines 3—3 and 4—4, respectively, in Fig. 2.

With reference to the drawings, the nozzle device of this invention is illustrated in Fig. 2 as including a tubular or hollow body member 10 having one end 11 adapted for threadable connection with a usual garden hose 12. Extended within the opposite end 13 of the body member 10 is a valve unit, indicated generally as 14, for controlling the flow of water through an outlet 15, which is formed in one side of the body member 10. The valve unit 14 has a valve stem 16 provided at its outer end with a hand grip 17. A valve member 18, at the inner end of the valve stem 16, is engageable with an annular valve seat 19 which is projected inwardly of the central bore or passage 20 of the body member 10. The valve stem 16 is rotatably extended through a packing member 22, which closes the body member 10 at its end 13, and is threaded within the body member at 21.

It is seen, therefore, that on rotation of the hand grip 17 in one direction, the valve member 18 is raised from its seat 19 to permit a flow of water through the inlet 11 and passage 20 through the outlet 15. On rotation of the hand grip 17 in an opposite direction, the valve 18 is engaged with the seat 19 to stop any flow of water through the outlet 15. The outer end of the outlet 15 is formed with an annular shoulder 23 arranged within a laterally projected peripheral rim 25 for a purpose which will appear later.

Integrally formed with the body member 10 and extended outwardly from the outlet 15 is a substantially U-shaped support 24 having the legs thereof arranged at opposite sides of the outlet 15. A tubular coupling member 26 is threadable in the base 27 of the U support 24 in substantial coaxial alignment with the outlet 15. The inner end of the coupling member 26 is integrally formed with a finger grip member 28 (Figs. 2 and 3) to facilitate the axial adjustment of the coupling member. Formed within the top surface of the hand grip member 28 is an annular shoulder 29 arranged within an upstanding peripheral rim 30.

A tubular member 31, composed of a transparent material such as glass or a plastic, is of a size adapted to have its opposite ends received within the annular rims 25 and 30. The tube member 31 is maintained within the rims 25 and 30 by rotation of the coupling member 26 to an inwardly axially moved position providing for the member 31 being clamped between the shoulders 23 and 29. The transparent member 31 is fluid sealed with the body member 10 and the coupling member 26 by gasket members 32 and 32a arranged between the opposite ends of the transparent member and the shoulders 23 and 29, respectively.

A nozzle member 33 includes a pipe member 35 having its inner end 34 threaded within the outer end 36 of the coupling member 26. Threaded within the outer end of the pipe 35 is a solid nozzle tip 38 which is integrally formed with a conical outer end 39 having a pair of oppositely arranged guide wings or ribs 41. The nozzle tip 38 is of a solid construction and adapted for ground penetration purposes only (Figs. 2 and 4). The pipe 35, adjacent to the nozzle tip 41, is formed with a series of outlet openings 42. It is seen, therefore, that when the valve 14 is in an open position, water from the inlet 11 flows through the passage 20, outlet 15, transparent tube 31, the coupling member 26 and the pipe 35 for passage outwardly from the nozzle device and into the ground through the pipe openings 42.

In the use of the nozzle device of this invention a plant food in tablet or solid form, indicated at 43, is placed within the transparent tube 31 which constitutes a removable container for the plant food. The supply of a plant food to the tube or container 31 is simply accomplished by merely rotating the coupling member 26 and nozzle member 33 as a unit for movement in a direction outwardly from the outlet 15 until the outer end of the tube 31 is free of the coupling member 26. After the plant food 43 has been inserted within the transparent container or tube 31, the tube is readily clamped within the nozzle device by merely inserting its inner end within the rim 25 and then moving the tubular member 26 into engagement with its outer end. Positioned within the rim 30 between the gasket 32a and the shoulder 29 is an annular screen, or perforated member 44, which has a raised central portion 46 extended within the outer end of the tube 31.

The plant food 43 may contain general nutrient plant foods such as nitrogen, potassium, calcium and certain trace elements and when acted upon by water disintegrates partially into solution with the water and partially as particles suspended in solution. The plant food tablet is of a size somewhat less than the size of the transparent tube 31 so as to permit a free flow of water thereabout and through the tube 31.

With the plant food in the container 31, the nozzle member 33 is inserted within the ground, in a manner illustrated in Fig. 1, by gripping the body member 10 in one hand and pushing in a downward direction thereon. During this insertion of the nozzle device, the tube 31 is without any strain, by virtue of the support of the nozzle member 33 within the base 27 of the U member 24, and the assembly of the tube 31 between the inner end of the coupling member 26 and the outlet 15. It is thus seen that any forces applied on the body member 10 are carried directly by the support 24 to the nozzle member 33.

The nozzle member 33 may be inserted into the ground either before or after the valve 14 is manipulated to an open position, depending upon the nature of the soil being treated. It is contemplated that the pipe member 35 be in the neighborhood of about thirty-two inches long so that it is capable of being extended into the ground a distance sufficient to supply food to the roots of trees. For smaller plants, it is only necessary that the nozzle member 33 be partially inserted within the ground.

With the valve 14 in an open position, the passage of the water through the nozzle device and outwardly therefrom through the openings 42 provides for a gradual wearing away or disintegration of the plant food 43. The perforated member 44 acts to maintain the plant food 43 within the tube or container 31 against washing downwardly within the pipe 35 as it becomes used. It is to be understood that the perforations in the member 44 are of a size to permit small particles of the plant food 43 passing therethrough in suspension in the water for travel outwardly through the openings 42.

By virtue of the transparent construction of the tube 31 the progress of disintegration of the plant food 43 by the action of the water is completely visible so that the tube 31 can be refilled whenever necessary. Stopping of the feeding operation to determine the supply of plant food in the tube 31 is thus eliminated, as is also any chance of operating the nozzle device after the supply of plant food in the tube 31 has been exhausted.

From the above description it is seen that the invention provides a nozzle device for supplying a plant food to the roots of plants which is of a simple and compact construction, readily adapted for use with a usual garden hose, and including a plant food container which constitutes a removable conduit in the water passage system of the nozzle. This removable container is of a transparent construction so that the supply of plant food in the device is completely visible at all times, and with the container being supported in the device so as to be entirely free of any strains or stresses resulting from manually inserting the device within the ground.

Although the invention has been described with respect to a preferred embodiment thereof, it is to be understood that parts thereof may be arranged and changes and modifications made therein, all in a manner which are within the full intended scope of this invention, as defined by the appended claims.

I claim:

1. A nozzle device for supplying a plant food to the roots of plants comprising, a tubular body member connectible at one end with a source of water supply, an outlet in one side of said body member, valve means positioned in the other end of said body member for controlling the flow of water through said outlet, a nozzle member for insertion in the ground, a substantially U-shaped support projected laterally from said one side of the body member, means supporting said nozzle member at the outer end of said U support for adjustable axial movement, and a transparent tubular member adapted to be releasably clamped between said nozzle member and said outlet on axial movement of said nozzle member in one direction, with said transparent member constituting a container for a plant food.

2. A nozzle device for supplying a plant food to the roots of plants comprising, a tubular body member connectible at one end with a source of water supply, an outlet in one side of said body member having an outwardly extended annular rim, a valve in the opposite end of said body member for controlling the flow of water through said outlet, a U-shaped support projected outwardly from said one side, a tubular coupling member threadably supported in the base of said U support in substantial coaxial alignment with said outlet, with the inner end of said coupling member being formed with an axially projected annular rim, a nozzle member for insertion in the ground threadable within the outer end of said coupling member, a removable glass tube having the opposite ends thereof receivable in said annular rims, said glass tube, on rotation of said coupling member in one direction, being clamped between said outlet and said coupling member, and a perforated annular member positioned across the outer end of said glass tube, with said glass tube constituting a container for a plant food.

ROSS DANIELS.

REFERENCES CITED

The following references are of record in the file of this patent:

UNITED STATES PATENTS

| Number | Name | Date |
| --- | --- | --- |
| 563,195 | Lyon | June 30, 1896 |
| 2,016,983 | Bruce | Oct. 8, 1935 |
| 2,242,789 | McFee | May 20, 1941 |
| 2,419,845 | Merrick | Apr. 29, 1947 |